United States Patent

Shirahama et al.

[11] Patent Number: 6,067,124
[45] Date of Patent: May 23, 2000

[54] IMAGE PROCESSING APPARATUS AND PROCESSING METHOD

[75] Inventors: Akira Shirahama; Shinichiro Miyazaki, both of Kanagawa; Takeshi Ohno, Saitama; Nobuo Ueki, Chiba, all of Japan

[73] Assignee: Sony Corporation, Tokyo, Japan

[21] Appl. No.: 09/008,041

[22] Filed: Jan. 16, 1998

[30] Foreign Application Priority Data

Jan. 21, 1997 [JP] Japan .................................. 9-008918

[51] Int. Cl.[7] .................................................. H04N 5/262
[52] U.S. Cl. ........................................... 348/581; 348/578
[58] Field of Search .......................... 348/578, 580–583, 348/571; 345/347–349, 126, 127; H04N 5/262

[56] References Cited

FOREIGN PATENT DOCUMENTS 2172167 9/1986 United Kingdom ............ H04N 5/262
2244622 12/1991 United Kingdom ............ H04N 5/262

OTHER PUBLICATIONS

Booth, Kellog S. "Tutorial: Computer Graphics", IEEE Computer Society, 78 and 79, 1978.

Primary Examiner—David E. Harvey
Attorney, Agent, or Firm—Frommer Lawrence & Haug, LLP.; William S. Frommer

[57] ABSTRACT

When an image size is changed by using a linear interpolating process, a picture quality is improved so as not to overlap the position of an original signal and the position of an interpolation signal. An interpolation interval Vdp which is derived from an original image and an image size after the conversion is stored into a register of an input side and is accumulated and added by an adder from a register of an output side through a selector. A predetermined calculation is performed and an offset value $q_0$ is obtained in a circuit. The value $q_0$ is selected by the selector and the register of the output side is initialized for a vertical blanking period. Thus, a value ($\delta$+nVdp) in which the value $q_0$ was added to the accumulation value of Vdp is derived. On the basis of the value ($\delta$+nVdp), a read address (n) of the original image and linear interpolation coefficients $q_{n1}$ and $q_{n2}$ are obtained. A similar process is also executed for the horizontal direction and an address (m) and coefficients $p_{n1}$ and $p_{n2}$ are obtained. A proper offset value is added to the interpolating position and the picture quality can be improved without overlapping the original signal and the interpolating position.

10 Claims, 14 Drawing Sheets

Fig. 1
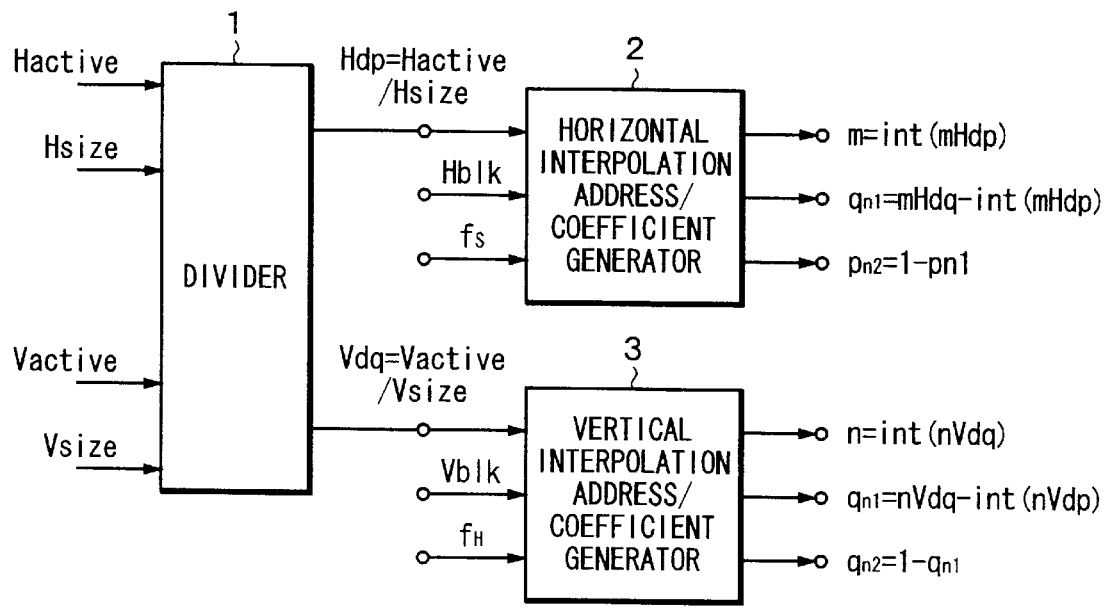
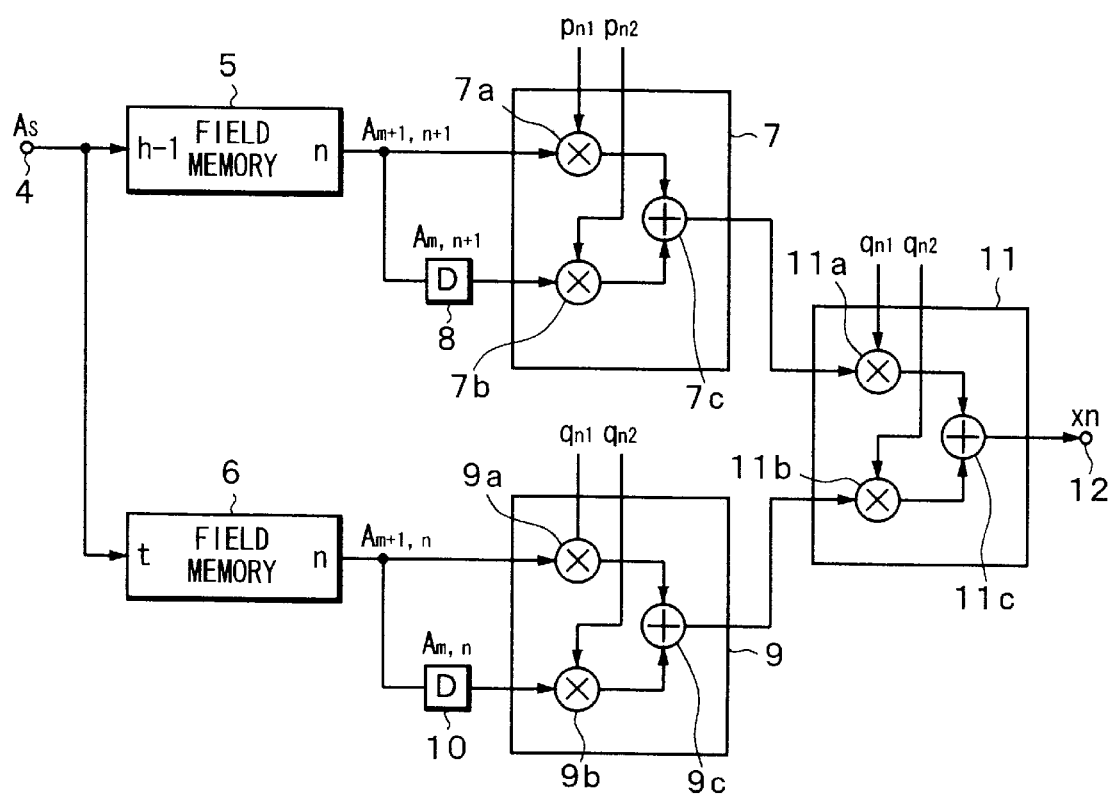

Fig. 4A

| | 1 | | m | | M |
|---|---|---|---|---|---|
| 1 | $A_{1,1}$ | $\cdots$ | $A_{m,1}$ | $\cdots$ | $A_{M,1}$ |
| 2 | $A_{1,2}$ | $\cdots$ | $A_{m,2}$ | $\cdots$ | $A_{M,2}$ |
| $\vdots$ | $\vdots$ | $\cdots$ | $\vdots$ | $\cdots$ | $\vdots$ |
| n-1 | $A_{1,n-1}$ | $\cdots$ | $A_{m,n-1}$ | $\cdots$ | $A_{M,n-1}$ |
| n | $A_{1,n}$ | $\cdots$ | $A_{m,n}$ | $\cdots$ | $A_{M,n}$ |
| $\vdots$ | $\vdots$ | $\cdots$ | $\vdots$ | $\cdots$ | $\vdots$ |
| N-1 | $A_{1,N-1}$ | $\cdots$ | $A_{m,N-1}$ | $\cdots$ | $A_{M,N-1}$ |

Fig. 4B

| | 1 | | m | | M |
|---|---|---|---|---|---|
| 1 | $A_{1,2}$ | $\cdots$ | $A_{m,2}$ | $\cdots$ | $A_{M,2}$ |
| 2 | $A_{1,3}$ | $\cdots$ | $A_{m,3}$ | $\cdots$ | $A_{M,3}$ |
| $\vdots$ | $\vdots$ | $\cdots$ | $\vdots$ | $\cdots$ | $\vdots$ |
| n-1 | $A_{1,n}$ | $\cdots$ | $A_{m,n}$ | $\cdots$ | $A_{M,n}$ |
| n | $A_{1,n-1}$ | $\cdots$ | $A_{m,n+1}$ | $\cdots$ | $A_{M,n+1}$ |
| $\vdots$ | $\vdots$ | $\cdots$ | $\vdots$ | $\cdots$ | $\vdots$ |
| N-1 | $A_{1,N}$ | $\cdots$ | $A_{m,N}$ | $\cdots$ | $A_{M,N}$ |

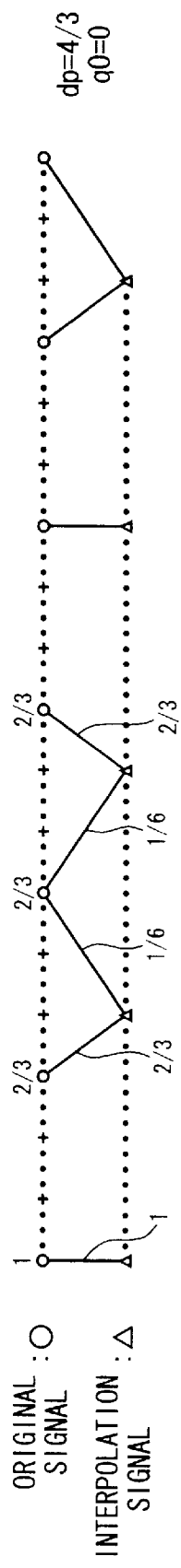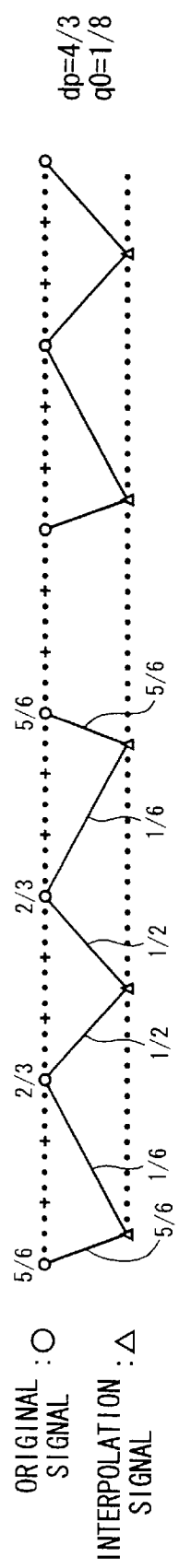

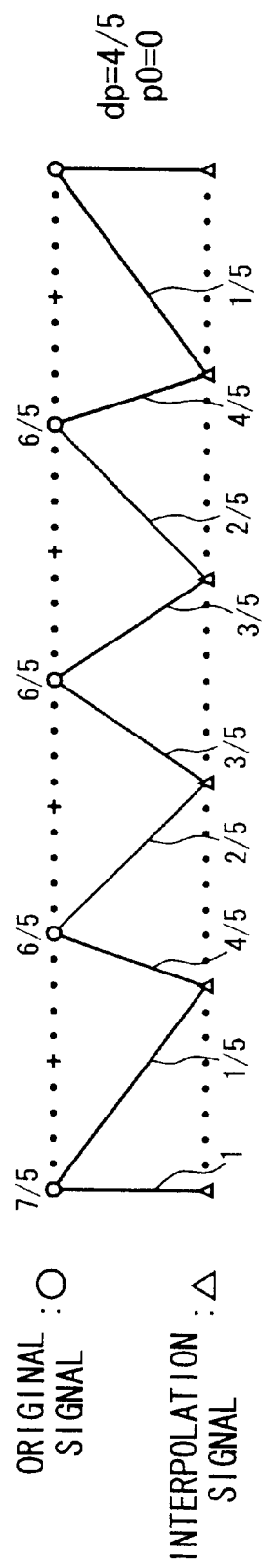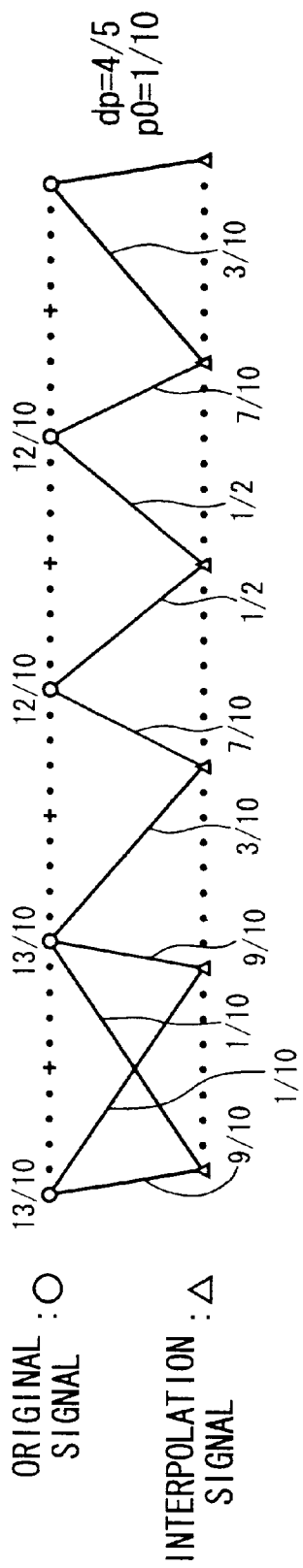

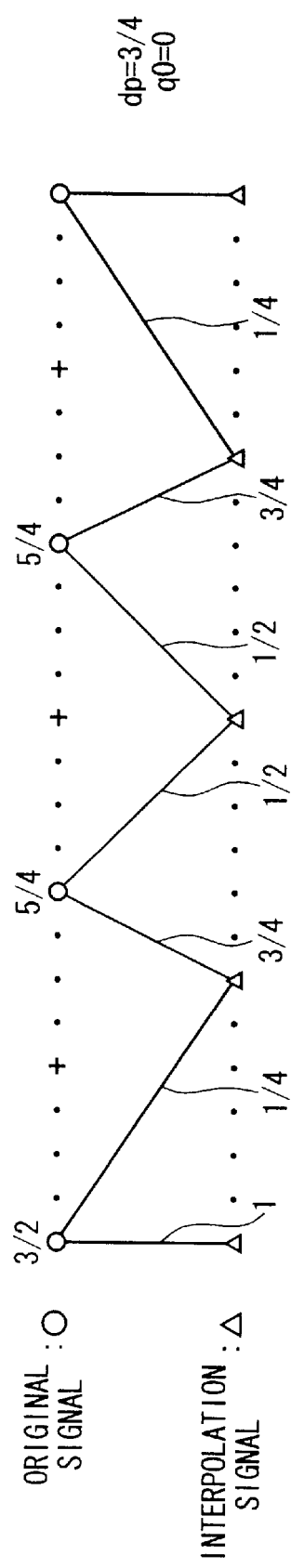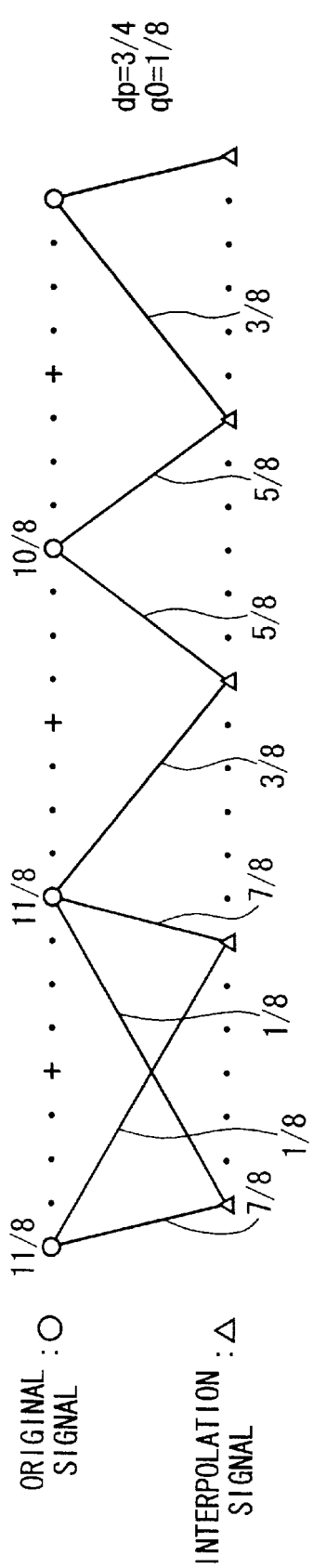

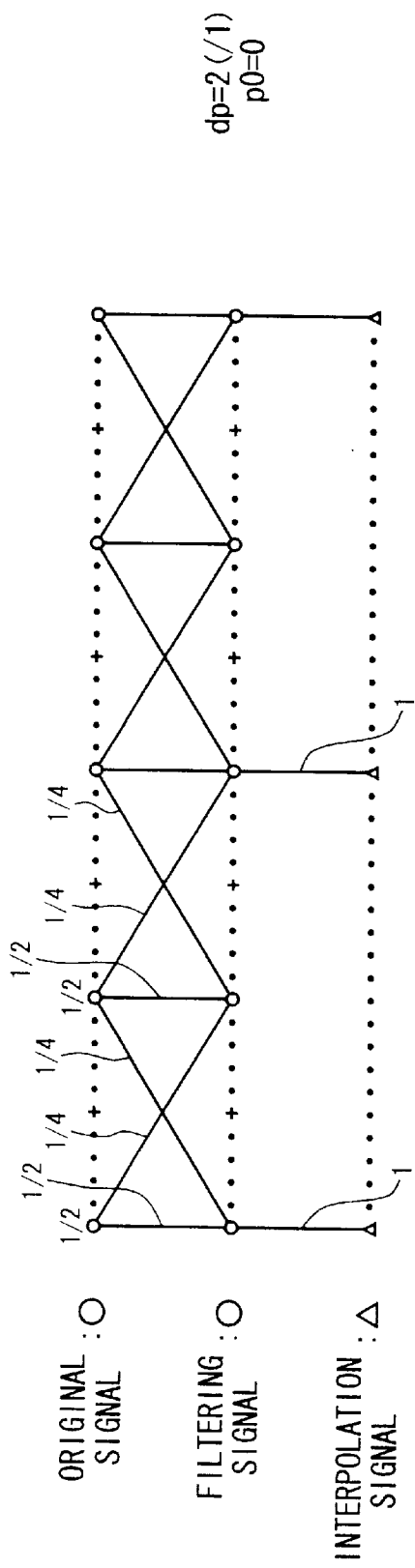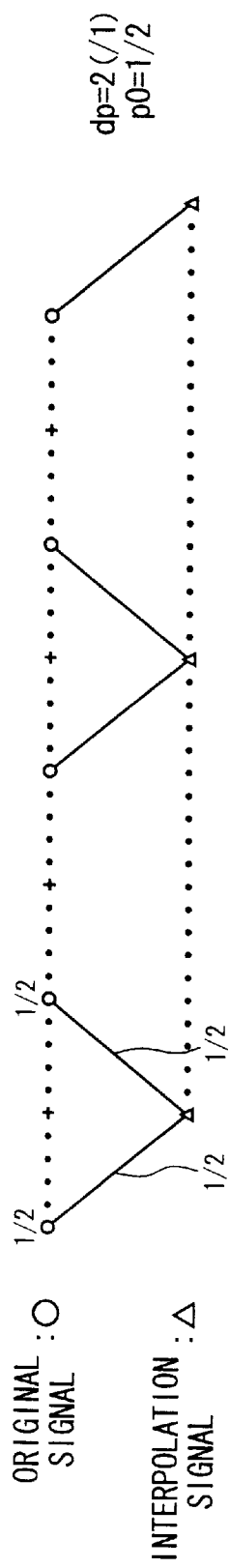

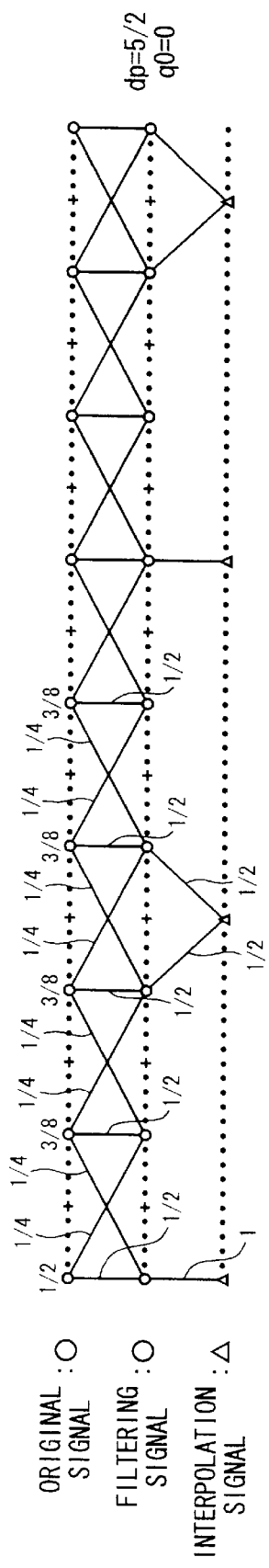
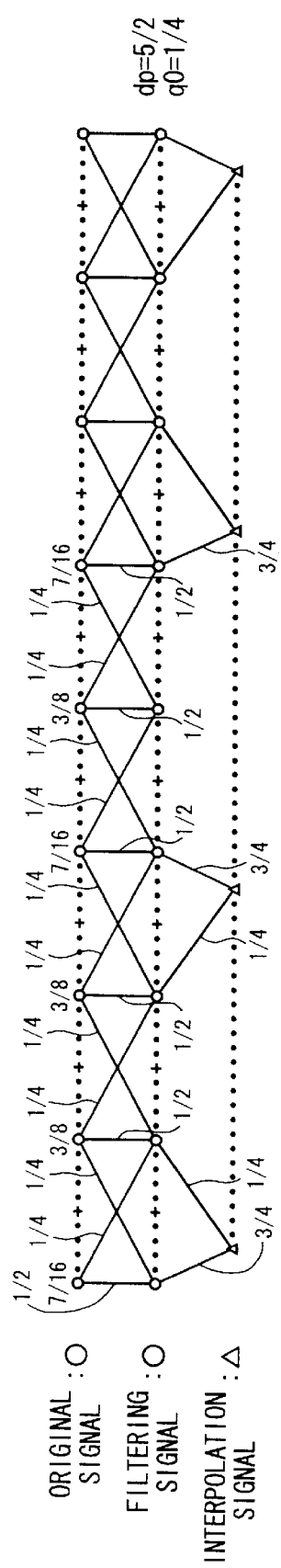
Fig. 11A
Fig. 11B

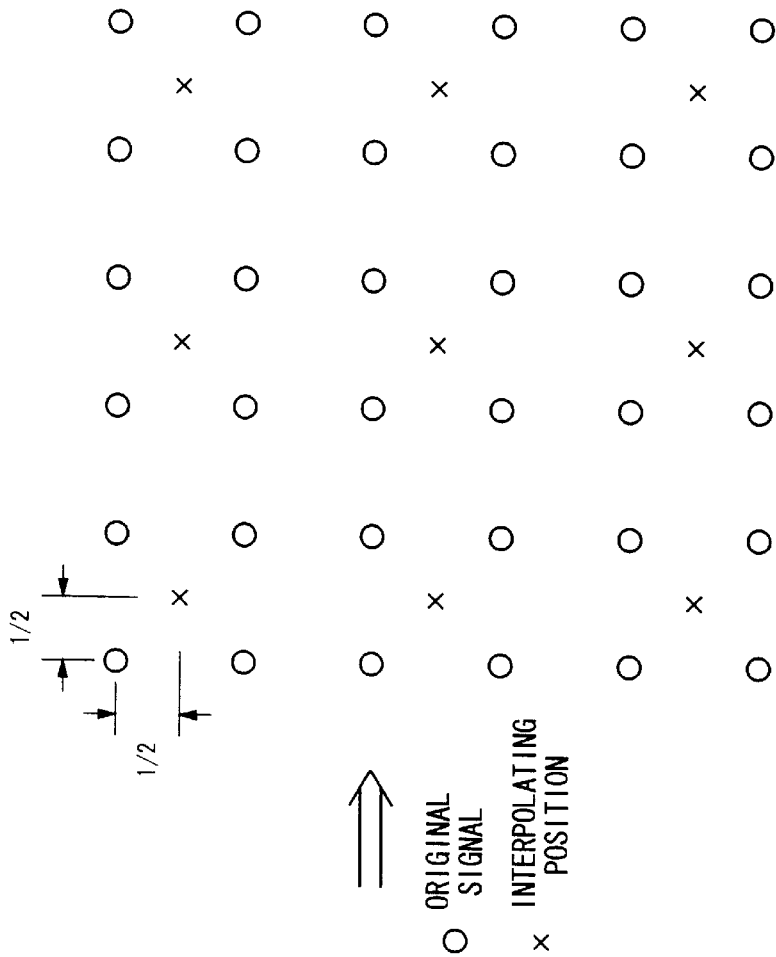
Fig. 13B
Fig. 13A

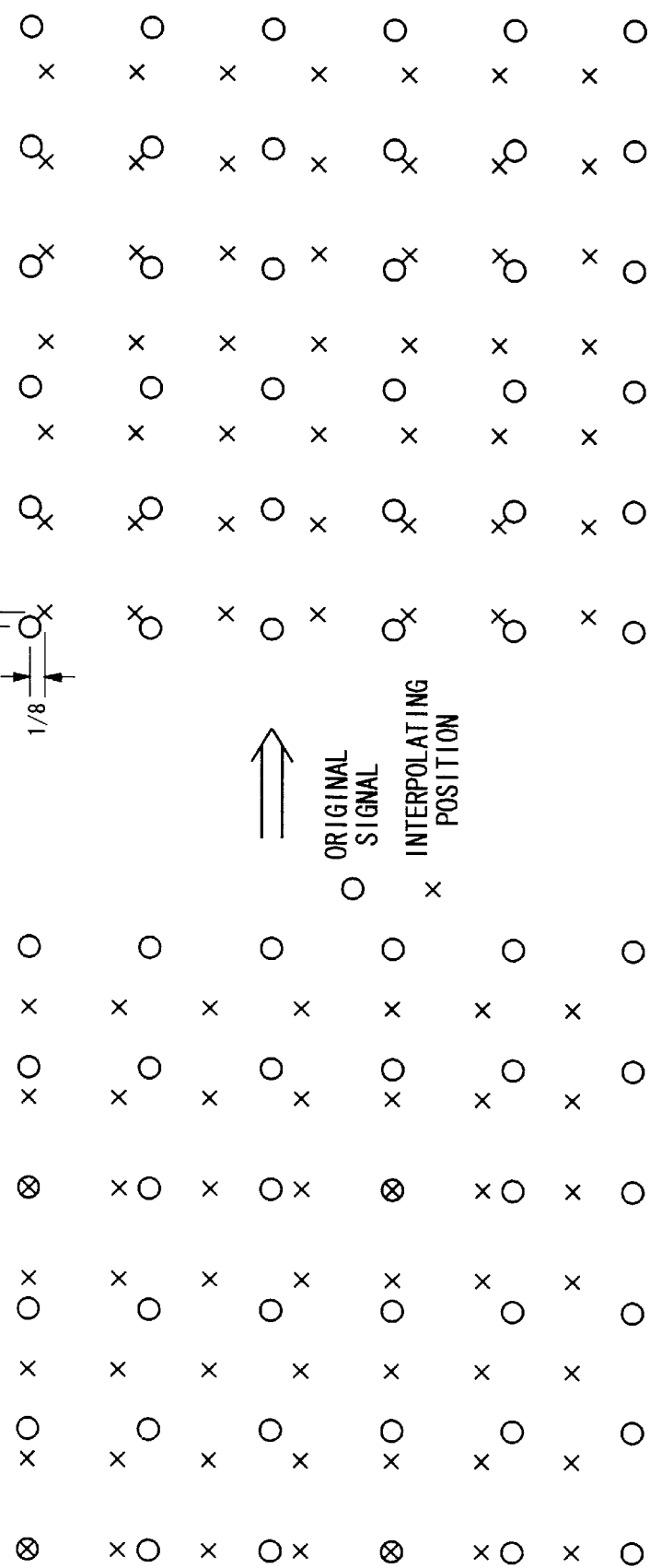

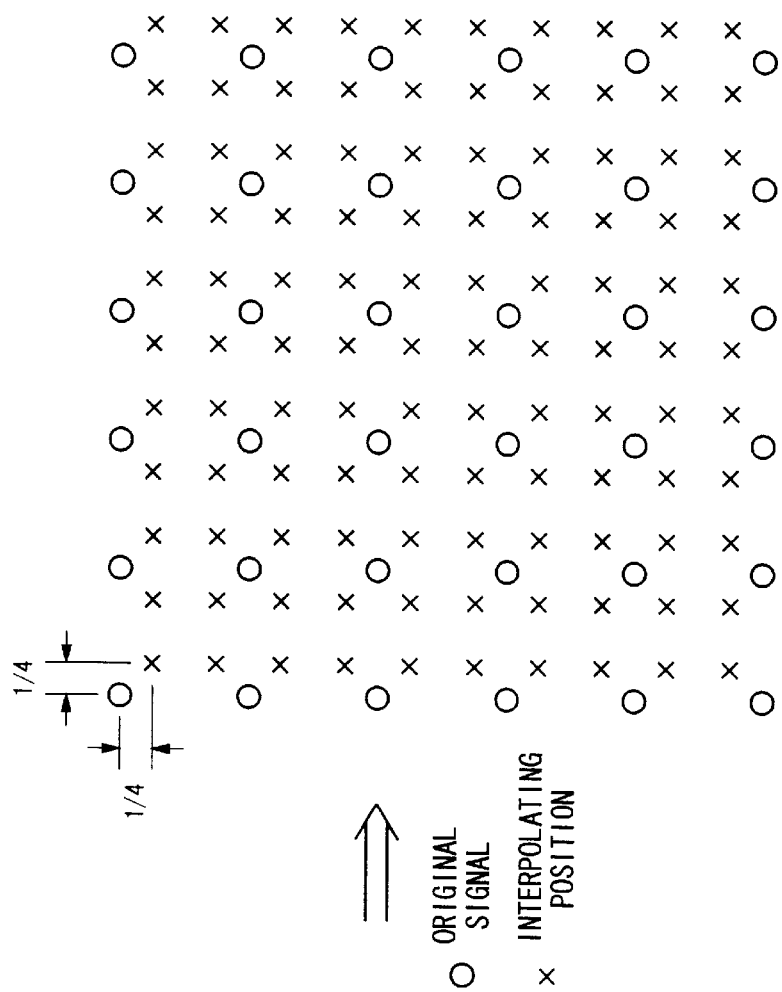
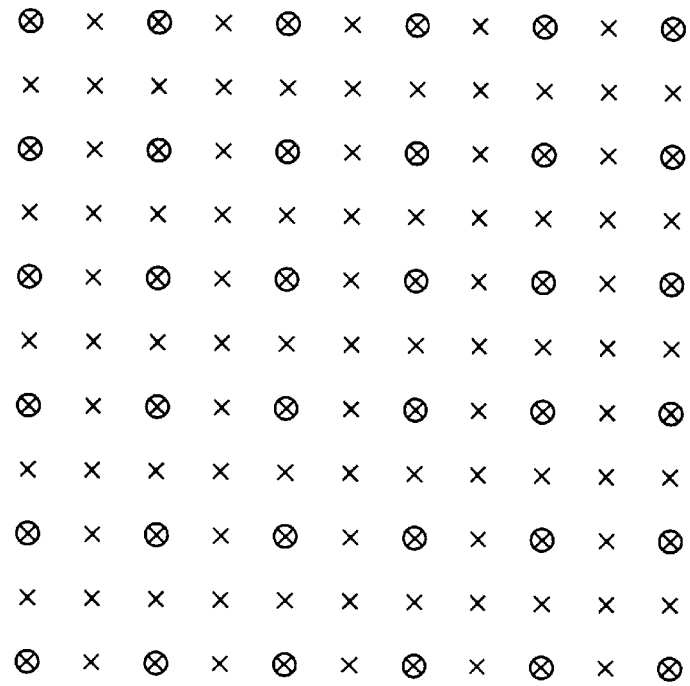

IMAGE PROCESSING APPARATUS AND PROCESSING METHOD

BACKGROUND OF THE INVENTION

1. Field of the Invention

The invention relates to an image processing apparatus and a processing method for improving a picture quality by properly setting an interpolating position when an image size is converted by using a linear interpolation.

2. Description of the Related Art

Hitherto, for example, in a television receiver, it is demanded to display simultaneously or one to plural slave picture planes reduced at, for example, an arbitrary ratio for a main master picture plane. In such a case, hitherto, when a pixel number conversion for reduction display is performed, an interpolation origin is fixed and an interpolating process is executed at a pixel position obtained at an interval according to a conversion ratio.

A method called a linear interpolation is known as an interpolation processing method when enlarging or reducing at an arbitrary ratio while preventing a deterioration of a picture quality. According to the linear interpolation, a position on an original image of an arbitrary pixel in a conversion image obtained by enlarging or reducing the original image is obtained and a dense/thin value of the above point in the conversion image is obtained on the basis of dense/thin values of pixels at four points near the obtained position in the original image.

In such an interpolating process, however, a portion where the pixel position of the original signal and the pixel position after the interpolation coincide periodically occurs in dependence on a conversion ratio. In this case, the pixel of the same dense/thin value as that of the original image and the interpolated pixel are periodically displayed. In the pixel having the same dense/thin value as that of the original signal and the interpolated pixel, since energies of the pixels are different, such a state is observed as glitter of the image, luminance variation, pixel missing, or the like on the picture plane, so that there is a problem such that the image is very hard to see. This problem exerts a large influence on, particularly, a character display.

To prevent it, hitherto, for example, a method of performing a pre-filtering process by a low pass filter before the interpolating process has been used. However, in case of enlarging or reducing the image at an arbitrary magnification, since the characteristics of the filter have to be adaptively changed, there is a problem that the optimum filtering process is difficult. There is also a case where the image contrarily becomes oblique depending on the process.

OBJECTS AND SUMMARY OF THE INVENTION

It is, therefore, an object of the invention to provide an image processing apparatus and a processing method such that a picture quality is improved so that a position of an original signal and a position of an interpolation signal are not overlapped when an image size is changed by using, for example, a linear interpolating process.

According to the invention, to solve the foregoing problem, there is provided an image processing apparatus for converting an image size by using linear interpolation, comprising: input means for inputting a video signal; storage means for storing the video signal; interpolation interval calculating means for obtaining an interpolation interval from an image size based on the video signal and a desired image size; offset value output means for outputting an offset value which is added to an interpolating position based on the interpolation interval; and interpolation processing means for performing an interpolating process for the desired image size on the basis of an interpolating position based on the interpolation interval and the offset value.

According to the invention, to solve the above problem, there is provided an image processing method of converting an image size by using linear interpolation, comprising: an input step of inputting a video signal; a storing step of storing the video signal into storage means; an interpolation interval calculating step of obtaining an interpolation interval from an image size based on the video signal and a desired image size; an offset value output step of outputting an offset value which is added to an interpolating position based on the interpolation interval; and an interpolation processing step of performing an interpolating process for the desired image size on the basis of an interpolating position based on the interpolation interval and the offset value.

According to the invention as mentioned above, since the offset value such that the pixel position of the original signal and the interpolating position are not periodically overlapped for the interpolating position based on the interpolation interval, the luminance variation of the image in case of enlarging or reducing the image by the linear interpolation is suppressed.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a block diagram showing an example of a construction of an image processing apparatus according to the invention;

FIGS. 4A and 4B are schematic diagrams showing examples of an address mapping of a field memory;

FIGS. 6A and 6B are schematic diatrams schematically showing a difference of a relation between an original signal position and an interpolating position depending on the presence or absence of an offset value;

FIGS. 7A and 7B are schematic diagrams schematically showing a difference of a relation between an original signal position and an interpolating position depending on the presence or absence of an offset value;

FIGS. 9A and 9B are schematic diagrams schematically showing a difference of a relation between an original signal position and an interpolating position depending on the presence or absence of an offset value;

FIGS. 10A and 10B are schematic diagrams schematically showing a difference of a relation between an original signal position and an interpolating position depending on the presence or absence of an offset value;

FIGS. 11A and 11B are schematic diagrams schematically showing a difference of a relation between an original signal position and an interpolating position depending on the presence or absence of an offset value;

FIGS. 13A and 13B are schematic diagrams schematically showing a difference of a relation between an original signal position and an interpolating position depending on the presence or absence of an offset value;

FIGS. 14A and 14B are schematic diagrams schematically showing a difference of a relation between an original signal position and an interpolating position depending on the presence or absence of an offset value; and FIGS. 15A and 15B are schematic diagrams schematically showing a difference of a relation between an original signal position and an interpolating position depending on the presence or absence of an offset value.

DETAILED DESCRIPTION OF THE PREFERRED EMBODIMENTS

Figure 2:
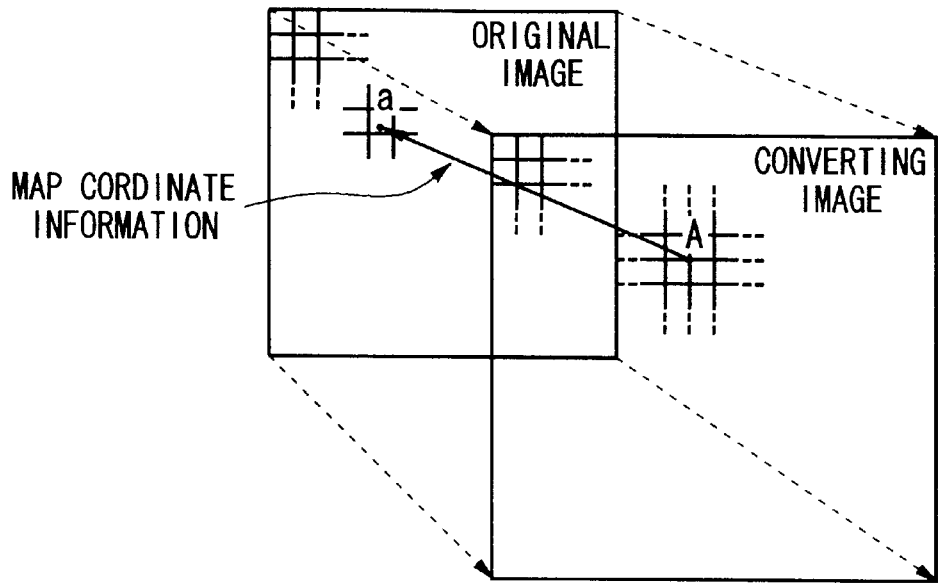
FIG. 2 is a schamatic diagram for explaining a linear interpolation.

An embodiment of the invention will now be described hereinbelow with reference to the drawings. FIG. 1 shows an example of a construction of an image processing apparatus according to the invention. In the example, an enlargement/reduction ratio is set for an inputted image signal and a linear interpolation is performed by dense/thin values at four upper, lower, right, and left points of a predetermined pixel. By properly selecting an interpolating position, an overlap of an original signal and the interpolating position is prevented. By diffusing an energy of pixels, a picture quality is improved.

The number of valid samples (the number of pixels in one line) $H_{active}$ in one line of the original signal and the number of valid horizontal pixels $H_{size}$ of the signal after completion of the conversion are supplied to a divider 1. Similarly, the number of valid lines $V_{active}$ in one field of the original signal and the number of valid lines $V_{size}$ after completion of the conversion are supplied to the divider 1.

Those values are supplied from a system controller (not shown) on the basis of, for example, a setting by the user and system set values. Although not shown, a horizontal blanking pulse $H_{blk}$, a sampling clock $f_s$, a vertical blanking pulse $V_{blk}$, a line clock $f_H$, and the like are extracted by predetermined means on the basis of the inputted image signal.

A division is performed in the divider 1 on the basis of the supplied values. A horizontal interpolation interval Hdp is obtained from $H_{active}/H_{size}$. Similarly, a vertical interpolation interval Vdq is obtained from $V_{active}/V_{size}$. The horizontal interpolation interval Hdp is supplied to a horizontal interpolation address/coefficient generator 2 and the vertical interpolation interval Vdq is supplied to a vertical interpolation address/coefficient generator 3.

The number $H_{active}$ of valid samples in one line has a value corresponding to a standard of a display such as 480, 640, 720, 768, or 910. The number $V_{active}$ of valid lines in one field corresponds to a standard of a video signal and is equal to 240 in a system of 525 lines/60 Hz, to 286 in a system of 625 lines/50 Hz, or the like. For example, in case of enlarging an image by 16/9 times as an area ratio at a constant aspect ratio, $H_{active}$ is set to 720 and, when $V_{active}$ is set to 240, $H_{size}$ is set to 960 and $V_{size}$ is set to 320. In this case, both of the horizontal interpolation interval Hdp and vertical interpolation interval Vdq are equal to 3/4.

On the basis of the supplied horizontal interpolation interval Hdp, horizontal blanking pulse $H_{blk}$, and sampling clock $f_s$, the horizontal address/coefficient generator 2 generates an interpolation horizontal address (m) serving as an address when data to be used for the interpolating process is read out from a field memory 5, which will be explained hereinafter, and a horizontal interpolation coefficient $p_{n1}$ serving as a coefficient when pixels which are neighboring in the horizontal direction are synthesized and interpolated. $p_{n2}$ as a complement for 1 of $p_{n1}$ is also generated.

Similarly, on the basis of the supplied vertical interpolation interval Vdq, vertical blanking pulse $V_{blk}$, and line clock $f_H$, the vertical address/coefficient generator 3 generates an interpolation vertical address (n), a vertical interpolation coefficient $q_{n1}$, and $q_{n2}$ which is a complement for 1 of $p_{n1}$. The details of processes in the horizontal address/coefficient generator 2 and vertical address/coefficient generator 3 will be explained hereinlater.

As mentioned above, in the embodiment, the enlargement/reduction of an image are performed by the linear interpolation. The linear interpolation will now be schematically described by using FIGS. 2 and 3. As shown in FIG. 2, a case of enlarging an original image 100 at an arbitrary magnification (k) and forming a conversion image 101 will be explained. First, a point $x_n$ on the original image 100 to which a point $X_n$ on the conversion image 101 corresponds is obtained. Coordinates of the point $x_n$ can be obtained by dividing coordinate values of the point $X_n$ by the magnification (k). For example, when it is assumed that the coordinates of the point $X_n$ are X(5, 3), the point $x_n$ is obtained by x(5/k, 3/k).

Figure 3:
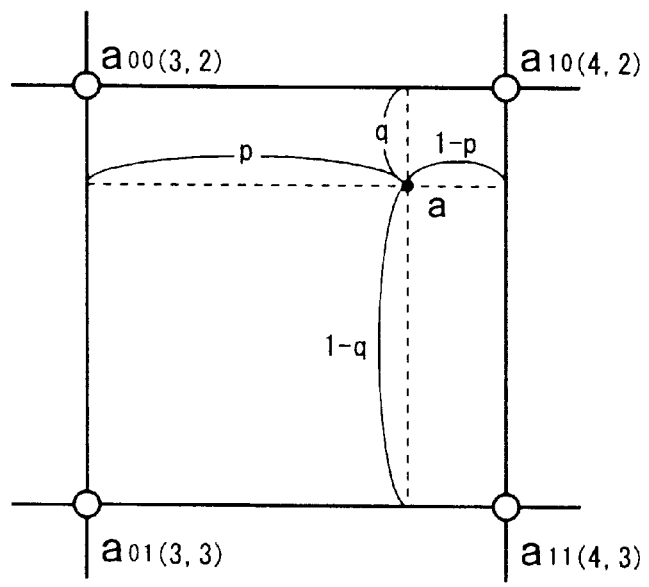
FIG. 3 is a schamatic diagram for explaining the linear interpolation.

On the coordinates of the original image, four pixels surrounding the point $x_n$ exist near this point whose coordinates were obtained. This state is shown in FIG. 3 and it is assumed that the four near the point $x_n$ are $A_{m,n}$, $A_{m+1,n}$, $A_{m,n+1}$ and $A_{m+1,n+1}$, respectively. On the basis of dense/thin values of the pixels of those four points and an internal ratio in a range surrounded by the four points near the position of the point $x_n$, a dense/thin value of the point $x_n$ can be obtained by the following equation (1). As an internal ratio, $p_{n1}$ and $p_{n2}$ as a horizontal interpolation coefficient and a complement to 1 thereof mentioned above are used in the horizontal direction and $q_{n1}$ and $q_{n2}$ as a vertical interpolation coefficient and a complement to 1 thereof mentioned above are used in the vertical direction, respectively.

[equation 1]

$$x_n = q_{n2}(p_{n2} \cdot A_{m,n} + p_{n1} \cdot A_{m+1,n}) + q_{n1}(p_{n2} \cdot A_{m,n+1} + p_{n1} \cdot A_{m+1,n+1}) \quad (1)$$

The dense/thin value of this point (x) is equal to the dense/thin value of the point (X) on the conversion coordinates. Therefore, the interpolation of pixels is performed by executing the calculation by the equation (1) with respect to all pixels on the conversion image, so that the conversion image can be obtained. In the process, the reason why the calculation is performed by mapping from the points on the conversion coordinates to the points on the original image is to prevent a pixel missing.

A pixel signal $A_s$ is sequentially supplied from a terminal 4 in accordance with, for example, a scanning of a video signal. The pixel signal $A_s$ consists of, for example, a luminance signal Y and a color difference signal U/V or digital data based on RGB signals, is filtered at the front stage (not shown) as necessary and is supplied.

The pixel signal $A_s$ is written into field memories 5 and 6. The writing operation is performed in such a manner that line addresses are deviated by every amount of one line in the field memories 5 and 6. FIGS. 4A and 4B show examples of an address mapping in the field memories 5 and 6 at this time. In the diagram, the longitudinal and lateral directions correspond to the vertical and horizontal directions, respectively. In correspondence to the number (M) of valid samples in one line and the number (N) of valid lines in one field, there are (M) pixels in the horizontal direction and addresses as many as (N−1) lines in the vertical direction. The number (M) of valid samples in one line and the number (N) of valid lines in one field correspond to the above-mentioned $H_{active}$ and $V_{active}$.

In the example, pixel signals of the first to (N−1)th lines are written into the field memory 6 shown in FIG. 4A and pixel data of the second to Nth lines is written into the field memory 5. With respect to the horizontal direction, pixel signals and pixel data of up to the Mth pixel are written into both of the memories. That is, for the same address (m, n), the pixel signal $A_{m,n}$ is written into the field memory 6 and the pixel signal $A_{m,n+1}$ is written into the field memory 5, respectively.

The pixel signals are read out from the same address in the field memories 5 and 6, respectively. The reading operation is performed on the basis of the horizontal interpolation address (m) generated from the horizontal interpolation address/coefficient generator 2 with respect to the horizontal direction. Similarly, the reading operation is performed on the basis of the vertical interpolation address (n) generated from the vertical interpolation address/coefficient generator 3 with respect to the vertical direction.

The pixel signal read out from the field memory 5 is supplied to one input terminal of a multiplier 7a in a product sum arithmetic operating device 7 comprising multipliers 7a and 7b and an adder 7c and is delayed by an amount of one pixel via a 1-pixel delay 8 and is supplied to one input terminal of the multiplier 7b. For example, when the pixel signal $A_{m,n+1}$ is read out from the field memory 5, the pixel signal $A_{m,n+1}$ is directly supplied to the multiplier 7a and the pixel signal $A_{m+1, n+1}$ delayed by one pixel is supplied to the multiplier 7b, respectively.

The interpolation coefficient $p_{n1}$ is supplied to another input terminal of the multiplier 7a and the interpolation coefficient $p_{n2}$ is supplied to another input terminal of the multiplier 7b. In the multipliers 7a and 7b, the multiplications of those interpolation coefficients and the foregoing pixel signals are executed, respectively. Multiplication results are supplied to one and another input terminals of the adder 7c. An addition result of the adder 7c is used as an arithmetic operation result of the product sum arithmetic operating device 7. As mentioned above, in the product sum arithmetic operating device 7, the arithmetic operation of the latter parentheses in the equation (1) is performed. An arithmetic operation result is supplied to one input terminal of a multiplier 11a in a product sum arithmetic operating device 11 having a similar construction.

Similar processes are performed with regard to the pixel signal read out from the field memory 6. Namely, the pixel signal $A_{m,n}$ read out from the memory 6 is supplied to one input terminal of a multiplier 9a in a product sum arithmetic operating device 9 and is also delayed by a time of one pixel by a 1-pixel delay 10 and is supplied as a pixel signal $A_{m-1,n}$ to one input terminal of a multiplier 9b. In each of the multipliers 9a and 9b, the multiplication of the coefficients $p_{n1}$ and $p_{n2}$ is executed. Multiplication results are added by an adder 9c. In a manner similar to the above, the arithmetic operation in the former parentheses in the equation (1) is performed by the product sum arithmetic operating device 9. An arithmetic operation result is supplied to one input terminal of a multiplier 11b of the product sum arithmetic operating device 11.

The interpolation coefficients $q_{n1}$ and $q_{n2}$ are supplied to other input terminals of the multipliers 11a and 11b in the product sum arithmetic operating device 11, respectively. In the multipliers 11a and 11b, multiplications are executed between arithmetic operation results of the product sum arithmetic operating devices 7 and 9 and the interpolation coefficients $q_{n1}$ and $q_{n2}$, respectively. Multiplication results are added by an adder 11c. An addition result is used as an arithmetic operation result of the product sum arithmetic operating device 11, thereby obtaining the dense/thin value of the point $x_n$. The arithmetic operation result is outputted to an output terminal 12.

The horizontal interpolation address/coefficient generator 2 and vertical interpolation address/coefficient generator 3 in the above-mentioned construction will now be explained. In the embodiment, the interpolating position is properly set by those generators 2 and 3. Since the generators 2 and 3 have the same fundamental construction except that the signals to be supplied are different, the following explanation will be made hereinbelow with respect to only the vertical interpolation address/coefficient generator 3.

Figure 5:
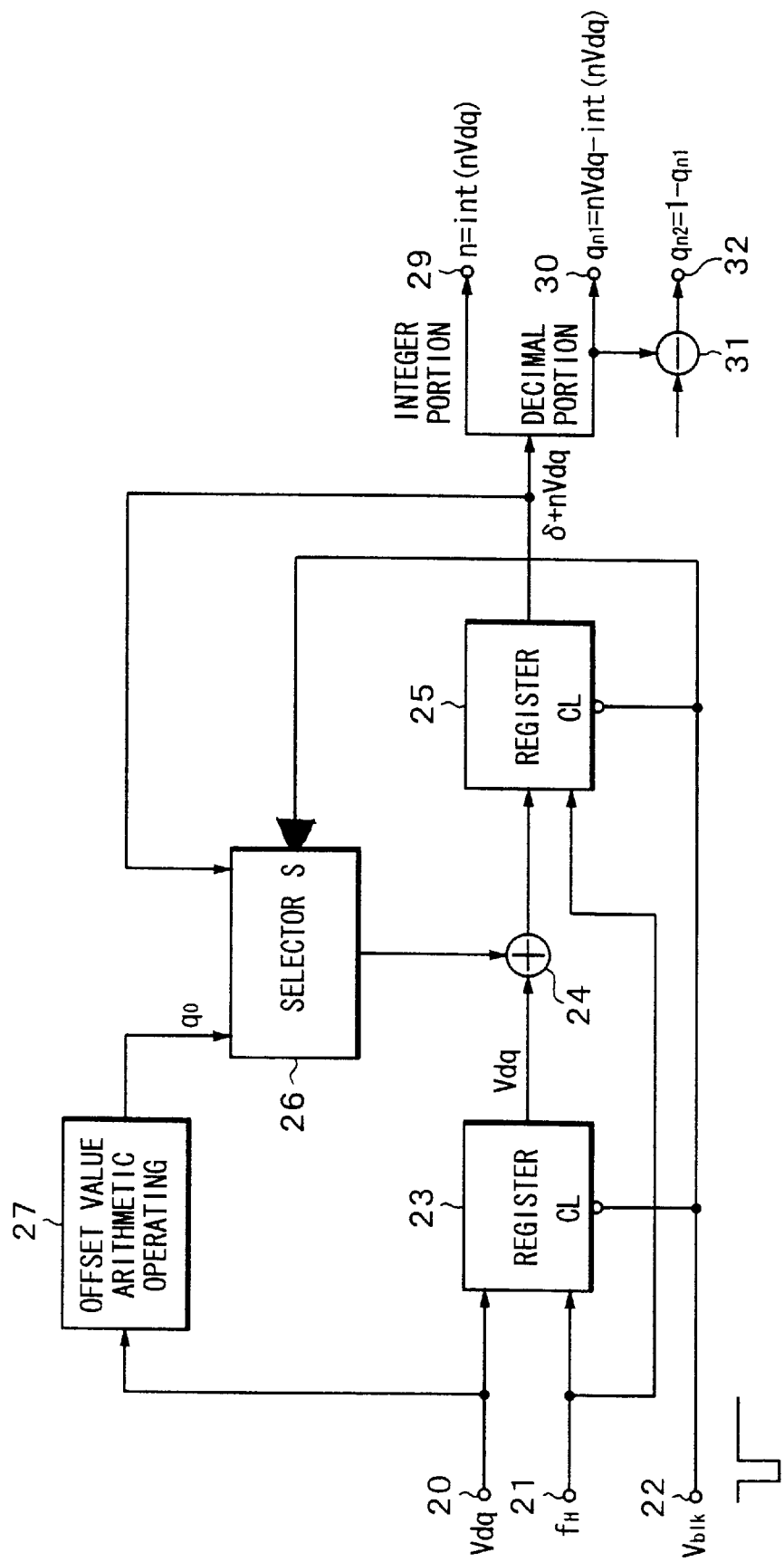
FIG. 5 is a block diagram showing an exmaple of a vertical interpolation address/coefficient generator.

FIG. 5 shows an example of the construction of the vertical interpolation address/coefficient generator 3. The vertical interpolation interval Vdq is supplied to a terminal 20. The line clock $f_H$ and vertical blanking pulse $V_{blk}$ are supplied to terminals 21 and 22, respectively. The clock $f_H$ is used as an operation clock of registers 23 and 25, which will be described hereinlater. The vertical blanking pulse $V_{blk}$ is supplied to the registers 23 and 25 and a selector 26, which will be explained hereinlater.

The vertical interpolation interval Vdq supplied to the terminal 20 is stored into the register 23. The vertical interpolation interval Vdq is supplied to the register 25 via one input terminal of an adder 24. The vertical interpolation interval Vdq is delayed by a time of one clock $f_H$ by the register 25 and is supplied to another input terminal of the adder 24 via one input terminal of the selector 26. That is, the vertical interpolation interval Vdq is accumulated and added every clock $f_H$ in the adder 24.

An offset value $q_0$ is supplied to another input terminal of the selector 26. As an offset value $q_0$, a value such that the pixel position and the interpolating position of the original signal are not periodically overlapped by adding the offset value to the interpolating position based on the vertical interpolation interval Vdq is selected. That is, the selector 26 selects another input terminal on the basis of the vertical blanking pulse $V_{blk}$ for a vertical blanking period. The registers 23 and 25 are cleared for the vertical blanking period.

The offset value $q_0$ is stored into the cleared register 25 and the vertical interpolation interval Vdq is again stored into the register 23. In the register 25, an initialization is performed by using the offset value as an initial value and the vertical interpolation interval Vdq is accumulated and added. Therefore, an output of the register 25 in the valid line interval is set to $q_0, q_0+2dp, \ldots, q_0+(N-1)dp$ for each line.

A method of calculating the offset value $q_0$ will now be described. It is assumed that (C) denotes a greatest common measure of Cs and Ct and (s) and (t) denote natural numbers. When Cs lines are converted into Ct lines in the vertical direction, a case where (t) is an odd number will be first explained. For example, 480 lines are converted into 360 lines in the vertical direction. The (480→360) conversion (reduction) will now be considered. At this time, as for the interpolation interval Vdq, it is assumed that Vdq=480/360= 4/3.

In the conventional method, as shown in FIG. 6A, with respect to the original signals shown by ○, interpolation signals shown by Δ appear at the coincident positions or positions which are deviated by 1/3 (or 2/3) or 2/3(or 1/3). At this time, when an interpolation start position is deviated by, for example, 1/6, as shown in FIG. 6B, the positions of the original signals shown by ○ don't always coincide with the positions of the interpolation signals shown by Δ. In the following description, the original signal is shown by ○ and the interpolation signal is shown by Δ in the diagram. A numerical values added to a line connecting the original signal and the interpolation signal denotes a ratio of an energy distribution of the original signal to the relevant interpolation signal.

The (480→600) conversion (enlargement) will now be considered. As for the interpolation interval Vdq at this time, it is assumed that Vdq=480/600=4/5. In the conventional method, as shown in FIG. 7A, the interpolation signals appear at the coincident positions or positions which are deviated by 4/5 (or 1/5), 3/5 (or 2/5), 2/5 (3/5), and 1/5 (or 4/5) with respect to the original signal. At this time, when the interpolation start position is deviated by, for example, 1/10, as shown in FIG. 7B, the positions of the original signals don't always coincide with the positions of the interpolation signals.

As will be understood from those examples, if the values before and after the conversion are expressed by a simplest integer ratio (s:t) which is obtained by dividing both of those values by the greatest common measure thereof [for example, it is shown by 4:3 in the (480→360) conversion and 4:5 in the (480→600) conversion], in case of no offset value for the interpolation start position, the interpolation signals appear at the coincident positions or positions which are deviated by k/t [(k) denotes a natural number smaller than (t)]. Therefore, when the interpolation start position is deviated by 1/2t, the positions of the original signals don't always coincide with the positions of the interpolation signals. In the embodiment, the value obtained as mentioned above is added to the interpolation start position as an offset value $q_0$.

The above effect can be understood by checking an energy propagation distribution by the linear interpolation with respect to each original signal. For example, the (480→360) conversion (reduction) will now be considered. Since it is the (4→3) conversion (the greatest common measure is 120), it is ideal that the energy by the interpolation is uniformly propagated at 3/4. In the foregoing conventional method shown in FIG. 6A, the original signal is energy distributed by a pattern (1, 3) of [1:(2/3):(2/3):(2/3)] and the maximum displacement difference (variation) is equal to 1/3 (=1−2/3).

On the other hand, when the method according to the embodiment as shown in FIG. 6B is used, the original signal is energy distributed by a pattern (2, 2) of [(5/6):(2/3):(2/3):(5/6)] and its maximum displacement difference (variation) is set to 1/6 (=5/6−2/3). As mentioned above, in the method according to the embodiment, as compared with the conventional method, a fluctuating period of the energy distribution is short and the maximum displacement difference is small, so that the smoother and ideal interpolation is derived.

Similarly, the (480→600) conversion (reduction) will now be considered. Since it is a (4→5) conversion, it is ideal that the energy distribution by the interpolation is uniformly distributed at 4/5. According to the conventional method shown in FIG. 7A, the original signal is energy distributed by a pattern (1, 3) of [(7/5):(6/5):(6/5):(6/5)] and its maximum displacement difference (variation) is equal to 1/5 (=7/5−6/5).

On the other hand, when the method according to the embodiment as shown in FIG. 7B is used, the original signal is energy distributed by a pattern (2, 2) of [(13/10):(13/10):(6/5):(6/5)] and its maximum displacement difference (variation) is equal to 1/10 (=13/10−6/5). In this case as well, in a manner similar to the above, the smoother and ideal interpolation as compared with that of the conventional method is performed.

As mentioned above, in case of the [Cs→Ct (C denotes the greatest common measure of Cs and Ct and (s) and (t) denote natural numbers] conversion, when (t) is an odd number, a more ideal linear interpolation can be executed by setting that interpolation interval Vdq=Cs/Ct=s/t and interpolation start offset value $q_0=1/2t$.

When (t) is an odd number, it can be expressed by (t=2s+1) [(s) denotes a natural number]. In this case, when (t) is deviated from k/t [(k) denotes a natural number smaller than (t)] by 1/2t, the position of the interpolation signal is set to [k/t+1/(2t)=(2k+1)/(2(2s+1))]. Therefore, when k=s, the position deviated from the original signal by 1/2 exists. For example, in the (4→3) conversion shown in FIGS. 6A and 6B, when the position is deviated from 1/3 by 1/6, it results in [1/3+1/6=3/6=1/2 (k=1, t=3)]. For instance, in the (4→5) conversion shown in FIGS. 7A and 7B, when the position is deviated from 2/5 by 1/10, it results in [2/5+1/10=5/10=1/2 (k=2, t=5). As mentioned above, when (t) is the odd number, the offset value at the interpolation start position in the case where the integer ratio is simple and an interpolating period is enough long is set to a fixed value of ($q_0=1/2$) and there is no problem.

On the other hand, when (t) is the even number, (t) can be expressed by [t=2t (t is a natural number)]. In this case, since it is obvious that (s) is the odd number, (s) can be expressed by [s=2t+1 (t is a natural number)]. Since the interpolating position in the conventional case is set to [k/t=k/(2t) (k is a natural number smaller than t)], k=t=t/2 and a position deviated from the original signal by 1/2 exists. Therefore, in a manner similar to the case of the odd number, when it is assumed that the offset value at the interpolation start position is set to the fixed value of ($q_0=1/2$), in case of a simple integer ratio, there is no effect.

It is proved that when (t) is the even number, as for the interpolation start offset $q_0$, it is sufficient to set $q_0=(s/t-\text{int}(s/t))/2$.

$$k/t+1/2t=j/t+(s/t-int(s/t))/2 \quad (2)$$

It is sufficient to show that the natural numbers (k) and (j) which satisfy the above equation (2) exist.

When both sides of the equation (2) are multiplied by 2t and the equation is rearranged, (k=j+p−qs) and [s=int(s/t)] are obtained. Since all of (p), (q), and (s) are integers, a set of (k) and (j) which satisfy the equation (2) exists.

For example, in a (5→2) conversion, when j=k, the left side of the equation (2) is obtained as follows.

$$k/t+1/2t=k/2+1/4$$

The right side is obtained as follows.

$$j/t+(s/t-int(s/t))/2=k/2+(5/2-int(5/2))/2=k/2+1/4$$

By the above equations, the offset value $q_0$ at the interpolation start position is obtained as follows.

$$q_0=(5/2-int(5/2))/2=1/4$$

Figure 8A:
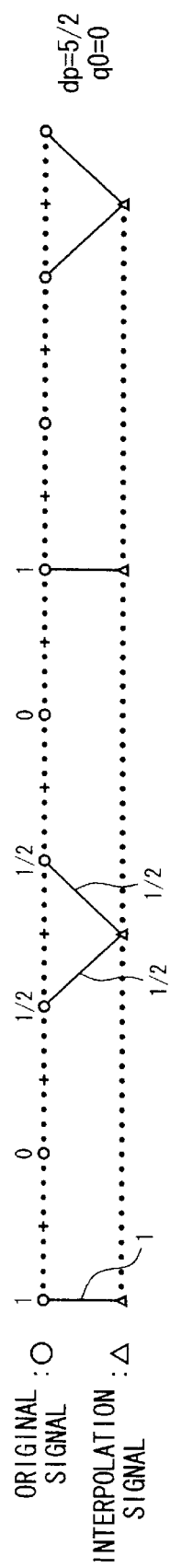
FIGS. 8A and 8B are schematic diagrams schematically showing a difference of a relation between an original signal position and an interpolating position depending on the presence or absence of an offset value.
Figure 8B:
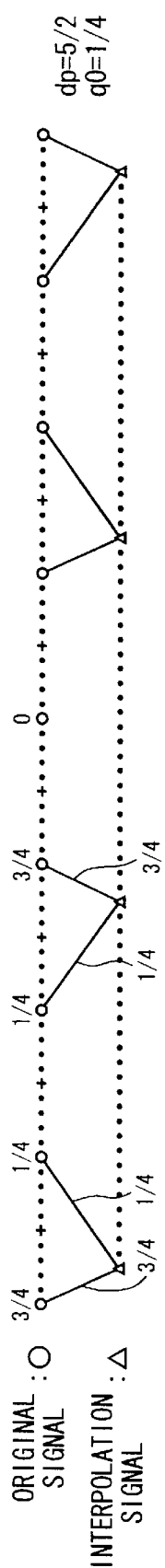

FIGS. 8A and 8B show the positional relation between the original signal and the interpolation signal with respect to a case where the offset value $q_0$ is not used and a case of using such a value.

For example, in a (3→4) conversion, when j=k−1, the left side of the equation (2) is obtained as follows.

$$k/t+1/(2t)=k/4+1/8$$

The right side of the equation (2) is obtained as follows.

$$j/t+(s/t-int(s/t))/2=(k-1)/4+(3/4-int(3/4))/2=k/4+1/8$$

By those equations, the offset value $q_0$ of the interpolation start position is obtained as follows.

$$q_0=(3/4-int(3/4))/2=3/8$$

FIGS. 9A and 9B show the positional relation between the original signal and the interpolation signal with respect to a case where the offset value $q_0$ is not used and a case of using such a value.

As mentioned above, when (t) is the even number, as for the offset value q at the interpolation start position in the case where the integer ratio is simple and the interpolating period is enough long, it is set to $q_0=(s/t-int(s/t))/2$ and there is no problem.

The method according to the embodiment is also preferably used with respect to a combination with a symmetric type FIR pre-filter. For example, in a (2→1) conversion, according to the conventional method shown in FIG. 10A, in case of only the linear interpolation, the pattern of [1:0] is used and it is a mere decimating process, so that a pre-filter process is needed. As shown in FIG. 10B, however, in the method according to the embodiment, since [(1/2):(1/2)] (constant) is set by the linear interpolation, the pre-filtering process is unnecessary.

In a (5→2) conversion, in the conventional method shown in FIG. 11A, the energy is distributed by a pattern (1, 4) of [(1/2):(3/8):(3/8):(3/8):(3/8)] and its maximum displacement difference (variation) is set to 1/8 (=1/2−3/8). On the other hand, in the method according to the embodiment shown in FIG. 11B, the energy is distributed by a pattern (1, 2, 1, 1) of [(7/16):(3/8):(3/8):(7/16):(3/8)] and its maximum displacement difference (variation) is set to 1/16 (=7/16−3/8), so that the smoother and ideal interpolation is performed.

Various methods are considered as a calculating method of the offset value. In the embodiment, for the vertical interpolation interval Vdq, when (t) is the odd number, $$q_0=abs(Vdq-1)/2 \qquad (3)$$

the offset value is obtained by the equation (3).
When (t) is the even number, $$q_0=(Vdq-int(Vdq))/2 \qquad (4)$$

the offset value is obtained by the equation (4).

That is, the vertical interpolation interval Vdq is supplied from the terminal 20 to an offset value arithmetic operating device 27. In the offset value arithmetic operating device 27, when (t) is the odd number, the equation (3) is calculated and, when (t) is the even number, the equation (4) is calculated. The offset value $q_0$ obtained as mentioned above is supplied to another input terminal of the selector 26.

A discrimination about whether (t) is the odd number or the even number in the offset value arithmetic operating device 27 can be performed on the basis of, for example, $V_{active}$ and $V_{size}$ supplied to the divider 1. For instance, it is also possible that the relation of the even number/odd number of (t) for the value of the vertical interpolation interval Vdq is preliminarily provided as a table in storing means such as an ROM (Read Only Memory) or the like and this table is referred to when the vertical interpolation interval Vdq is supplied.

The method of obtaining the offset value q. is not limited to the methods of obtaining by the equation (3) and the equation (4). For example, it is also possible that a table of the offset value $q_0$ for the vertical interpolation interval Vdq which has previously been formed is stored into storing means such as an ROM or the like and the offset value $q_0$ is obtained by referring to the table on the basis of the set vertical interpolation interval Vdq. In this case, it is desirable that the valid line number $V_{size}$ after the conversion can be set step by step.

As mentioned above, an output (δ+tVdq) to which the offset value $q_0$ was added and the vertical interpolation interval Vdq was accumulated and added is outputted from the register 25. In the output (δ+tVdq), an integer portion is derived as a vertical interpolation address (t) to a terminal 29. On the other hand, a decimal portion in the output of the register 25 is derived as a vertical interpolation coefficient $q_{n1}$ to a terminal 30. The decimal portion, namely, the vertical interpolation coefficient $q_{n1}$ is subtracted from "1" in a subtractor 31 and is derived as a coefficient $q_{n2}$ to a terminal 32.

Even in the horizontal interpolation address/coefficient generator 2, a process similar to that of the vertical interpolation address/coefficient generator 3 is executed. That is, in the horizontal interpolation address/coefficient generator 2, on the basis of the supplied Hdp, horizontal blanking pulse $H_{blk}$, and sampling clock $f_s$, an offset value $p_0$ is formed by, for example, an equation in which $q_0$ and Vdp in the above equation (2) are replaced to $p_0$ and Hdp. The horizontal interpolation interval Hdp is accumulated and added every line while using the offset value $p_0$ as an initial value. On the basis of the accumulation addition value, the horizontal interpolation address (m) and horizontal interpolation coefficients $p_{n1}$ and $p_{n2}$ are outputted.

Figure 12B:
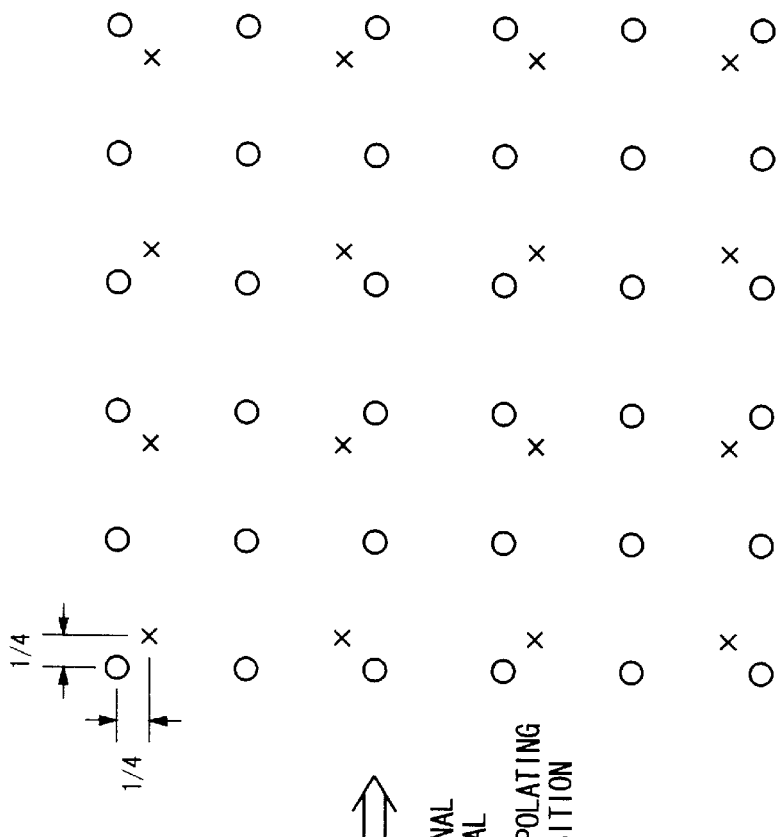
FIGS. 12A and 12B are schematic diagrams schematically showing a difference of a relation between an original signal position and an interpolating position depending on the presence or absence of an offset value.
Figure 12A:
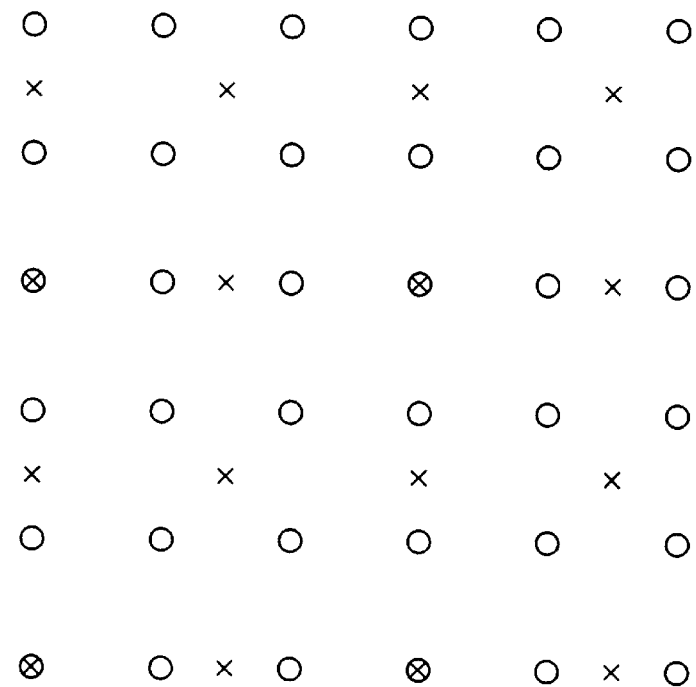

FIGS. 12A to 15B show an example in which an offset value is also added in the horizonal direction together with the vertical direction by a similar method in comparison with an example in which no offset value is added. FIGS. 12A to 15B relate to examples in which an area ratio is set to 4/9, 1/4, 16/9, and 4 times without changing the aspect ratio of an image, respectively. In FIGS. 12A and 12B of the area ratio 4/9, the vertical interpolation interval Vdq and horizontal interpolation interval Hdp are set to 3/2, respectively. The offset value $q_0$ in the vertical direction and the offset value $p_0$ in the horizonal direction are set to 1/4, respectively. In a manner similar to the above, Vdq=Hdp=2 and $q_0=P_0=1/2$ in FIGS. 13A and 13B, Vdq=Hdp=3/4 and $q_0=p_0=1/8$ in FIGS. 14A and 14B, and Vdq=Hdp=1/2 and $q_0=p_0=1/4$ in FIGS. 15A and 15B, respectively.

As will be also understood from those diagrams, in FIGS. 12A, 13A, 14A, and 15A as examples in which no offset value is added, the original signal position and the interpolating position periodically overlap in all of those cases. However, in FIGS. 12B, 13B, 14B, and 15B as examples in which the offset value is added, the original signal position and the interpolating position don't overlap in any of those cases.

By applying the invention as mentioned above, since the interpolation signal position is not overlapped to the original signal position, the energy of each pixel of the original signal is almost evenly distributed by the linear interpolation. Thus, for example, even if a pre-filter is not inserted before the interpolating process, the "glitter", luminance variation, pixel missing, or the like after completion of the enlargement/reduction converting process of the image can be suppressed.

In the above description, although the enlargement or reduction of the image has been performed without changing the aspect ratio of the original image, the invention is not limited to such an example. That is, the invention can be also applied to a case where the enlargement or reduction such as to change the aspect ratio of the image after the conversion is performed to the original image. The invention, therefore, can be also applied to a conversion between different video signal formats such as a conversion from the NTSC system to the PAL system.

Although the example of the linear interpolation by four upper, lower, right, and left points has been described above, the invention is not limited to such an example but can be also applied to other interpolating methods.

According to the invention as described above, since the accumulation of the interpolation interval when obtaining the interpolation coefficient is performed by being added with the offset value calculated by a predetermined method, the original signal position and the interpolating position do not overlap. Therefore, the energy of each pixel of the original signal by the linear interpolation is almost evenly diffused. The "glitter", luminance variation, pixel missing, or the like of the image after the interpolating process is suppressed and there is an effect that the picture quality can be improved.

There is an effect that it is unnecessary to insert the pre-filter before the interpolating process. There is also an effect such that pre-filter is inserted, the construction can be simplified.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An image processing apparatus for converting an image size by using linear interpolation, comprising:
    input means for inputting a video signal;
    storage means for storing said video signal;
    interpolation interval calculating means for obtaining an interpolation interval from an image size based on said video signal and a desired image size;
    offset value output means for outputting an offset value which is added to an interpolating position based on said interpolation interval; and
    interpolation processing means for performing an interpolating process for said desired image size on the basis of an interpolating position based on said interpolation interval and said offset value.

2. An image processing apparatus according to claim 1, wherein said interpolating means has
    accumulation addition calculating means which is initialized on the basis of said offset value every field of said video signal and accumulates and adds said interpolation intervals from said initialized state, thereby calculating an accumulation addition value, and
    the video signal read out from said storage means on the basis of address information comprising an integer part of said accumulation addition value is linearly interpolated on the basis of an interpolation coefficient comprising a decimal part of said accumulation addition value.

3. An image processing apparatus according to claim 1, wherein said offset value output means comprises memory means in which said offset value for said predetermined interpolation interval has previously been stored.

4. An image processing apparatus according to claim 1, wherein when a value in which a value of said desired image size is divided by a greatest common measure of the image size based on said video signal and said desired image size is an odd number, said offset value output means outputs an absolute value of a value obtained by subtracting "1" from said interpolation interval and by dividing a result of said subtraction by "2" as said offset value.

5. An image processing apparatus according to claim 1, wherein when a value in which a value of said desired image size is divided by a greatest common measure of the image size based on said video signal and said desired image size is an even number, said offset value output means outputs a value obtained by dividing a decimal part of said interpolation interval by "2" as said offset value.

6. An image processing apparatus according to claim 2, wherein said interpolation interval calculating means, said offset value output means, and said accumulation addition calculating means are provided for each of a horizonal direction and a vertical direction.

7. An image processing method of converting an image size by using linear interpolation, comprising:
    an input step of inputting a video signal;
    a storing step of storing said video signal into storage means;
    an interpolation interval calculating step of obtaining an interpolation interval from an image size based on said video signal and a desired image size;
    an offset value output step of outputting an offset value which is added to an interpolating position based on said interpolation interval; and
    an interpolation processing step of performing an interpolating process for said desired image size on the basis of an interpolating position based on said interpolation interval and said offset value.

8. An image processing method according to claim 7, wherein said interpolation processing step has
    an accumulation addition calculating step which is initialized on the basis of said offset value every field of said video signal and accumulates and adds said interpolation intervals from said initialized state, thereby calculating an accumulation addition value, and
    a step of linearly interpolating the video signal read out from said storage means on the basis of address information comprising an integer part of said accumulation addition value on the basis of an interpolation coefficient comprising a decimal part of said accumulation addition value.

9. An image processing method according to claim 7, wherein in said offset value output step, when a value in which a value of said desired image size is divided by a greatest common measure of the image size based on said video signal and said desired image size is an odd number, an absolute value of a value obtained by subtracting "1" from said interpolation interval and by dividing a result of said subtraction by "2" is outputted as said offset value.

10. An image processing method according to claim 7, wherein in said offset value output step, when a value in which a value of said desired image size is divided by a greatest common measure of the image size based on said video signal and said desired image size is an even number, a value obtained by dividing a decimal part of said interpolation interval by "2" is outputted as said offset value.

* * * * *